United States Patent
Sargeant et al.

[11] Patent Number: 6,025,090
[45] Date of Patent: Feb. 15, 2000

[54] END CAP ASSEMBLY FOR AN ALKALINE CELL

[75] Inventors: Sean A. Sargeant, Westford; William H. Gardner, North Easton, both of Mass.

[73] Assignee: Duracell Inc., Bethel, Conn.

[21] Appl. No.: 09/079,952

[22] Filed: May 15, 1998

[51] Int. Cl.[7] .............................. H01M 2/00; H01M 2/04; H01M 2/08

[52] U.S. Cl. ................... 429/163; 429/164; 429/175; 429/176; 429/185

[58] Field of Search .............................. 429/57, 163, 164, 429/175, 176, 177, 185

[56] References Cited

U.S. PATENT DOCUMENTS

| | | |
|---|---|---|
| 3,255,049 | 6/1966 | Wolfe . |
| 3,617,386 | 11/1971 | Bosben . |
| 4,537,841 | 8/1985 | Wiacek . |
| 4,670,362 | 6/1987 | Wiacek . |
| 4,999,264 | 3/1991 | Shepard et al. ........................ 429/171 |
| 5,080,985 | 1/1992 | Wiacek . |
| 5,532,081 | 7/1996 | Depalma . |

*Primary Examiner*—Maria Nuzzolillo
*Assistant Examiner*—Tracy Dove
*Attorney, Agent, or Firm*—Barry D. Josephs; Paul I. Douglas; Thomas G. Krivulka

[57] ABSTRACT

An end cap assembly is disclosed for sealing the open end of a cylindrical alkaline cell housing preferably having a diameter less than the diameter of AAA size cells. The end cap assembly is preferably intended for sealing AAAA (LR61) size cylindrical alkaline cells. The end cap assembly comprises a terminal end cap, an insulating sealing disk underlying said end cap, and an elongated current collector penetrating through an aperture in said insulating sealing disk. At least a portion of the insulating sealing disk lies within the cell housing to seal the open end thereof. The terminal end cap is located outside of said housing. The end cap assembly may include an insulating washer between the terminal end cap and the cell housing. The terminal end cap and the insulating washer are stacked over the peripheral edge of the cell housing at the open end of the cell housing. The insulating washer electrically insulates the terminal end cap from the cell housing. The insulating sealing disk has an integrally formed rupturable membrane therein. The membrane ruptures when gas pressure within the cell exceeds a predetermined level.

33 Claims, 3 Drawing Sheets

END CAP ASSEMBLY FOR AN ALKALINE CELL

FIELD OF THE INVENTION

The invention relates to an end cap assembly for sealing small diameter alkaline electrochemical cells, particularly AAAA (LR61) size alkaline cells. The invention relates to rupturable devices within the end cap assembly which allow gas to escape from the interior of the cell.

BACKGROUND

Conventional alkaline electrochemical cells are formed of a cylindrical housing having an open end. The housing is initially formed with an enlarged open end. After the cell contents are supplied, the cell is closed by crimping the housing edge over an edge of the end cap assembly and radially compressing the housing around the assembly to provide a tight seal. The end cap assembly comprises an exposed terminal end cap plate and typically a plastic insulating member which forms a plug at the open end of the housing and insulates the terminal end cap plate from the cell housing. A problem associated with design of alkaline cells is the tendency of the cell to produce gases as it continues to discharge beyond a certain point, normally around the point of complete exhaustion of the cell's useful capacity. Alkaline cell are conventionally provided with a rupturable member such as a diaphragm or membrane within the end cap assembly, for example, as described in U.S. Pat. No. 3,617,386. Such diaphragms or membranes are designed to rupture when gas pressure within the cell exceeds a predetermined level. The end cap assembly may be provided with vent holes for the gas to escape when the diaphragm or membrane is ruptured. The end cap assembly disclosed in U.S. Pat. No. 3,617,386 has considerable free space above the rupturable member, which reduces the amount of available space within the cell for active material.

In order to provide a tight seal alkaline cells have end cap assemblies which include a metal support disk inserted in a cavity within the plastic insulating member. The metal support disk may have a convoluted surface as shown in U.S. Pat. Nos. 5,532,081 or 5,080,985 which assures that end cap assembly can withstand high radial compressive forces during crimping of the cell's housing around the end cap assembly. Such support disk allows high radial forces to be applied during crimping. This results in a tight mechanical seal around the end cap assembly at all times. To provide additional support during crimping the peripheral edge of the terminal end cap may also be located in a cavity within the plastic insulating member as shown in U.S. Pat. No. 5,080,985. Such designs, however, can occupy additional space within the cell and can markedly increase the complexity of fabrication, particularly if applied to very small cells.

U.S. Pat. No. 4,670,362 discloses a plastic insulating disk which is snap fitted into the open end of a cylindrical casing for an alkaline cell. The disclosed insulating disk does not comprise nylon. The insulating disk disclosed in this reference is not contemplated for use in very small size cells, e.g., AAAA alkaline cells. The disclosed snap fitted insulating disk requires additional force for insertion into the open end of a cylindrical casing. Any additional force required for insertion of the insulating disk becomes a disadvantage in sealing very small diameter cells, e.g., AAAA size alkaline cells, because of the difficulty in handling such smaller cells.

A rupturable vent membrane may be integrally formed as part of the plastic insulating member included within the end cap assembly. Such vent membrane may typically be of circular shape as shown in U.S. Pat. No. 4,537,841. As shown in this reference the rupturable membrane may be integrally formed as a thin portion of the plastic insulating member. The rupturable membrane may also take the form of a grooved or circumferential configuration as disclosed in U.S. Pat. No. 5,080,985.

It is more difficult to obtain the required radial compression of the cell housing at the open end of the housing in sealing AAAA size cell than in sealing larger cells, without the use of a metal support disk or end cap plate captured within the housing. In part this is because in very small diameter alkaline cells, e.g. AAAA size cells, it becomes more difficult to step out the open end of housing out, i.e., enlarge the open end, when the housing is initially formed.

Another problem associated with the design of the end cap assemblies for AAAA alkaline cells is that any plastic insulating disk employed to seal the cell is of necessity very small diameter corresponding to the small cell diameter. Because such disks are very small, they may be more prone to cracking than plastic insulating disks for larger size cells.

SUMMARY OF THE INVENTION

The invention is directed to an end cap assembly, preferably for small diameter cylindrical alkaline cells. The end cap assembly is inserted into the open end of the housing for the cell. The invention is directed to end cap assemblies, preferably for cylindrical alkaline cells having a diameter less than the diameter of AAA size cells (less than about 10 millimeters, desirably a diameter between about 7 and 9 millimeters). In one preferred embodiment the invention is directed to an end cap assembly for AAAA (Quad A) cells (IEC designation "LR61" cells). Such cells have a diameter of between about 7.7 and 8.3 millimeters and a length of between about 41.5 and 42.5 millimeters.

It has been determined that for very small cylindrical alkaline cells, namely, cells having a cylindrical cell housing of diameter less than the diameter of an AAA cell housing, and particularly the diameter for AAAA (LR61) cell housing, a sufficiently tight seal may be obtained without including a metal support disk or any portion of the terminal end cap plate within the cell housing. In particular it has been determined that there is no need to employ a metal support disk (irrespective of whether it is flat or convoluted) anywhere within the cell housing. Instead, a sufficiently tight seal may be provided for such small cylindrical alkaline cells, e.g., AAAA (LR61) cells by employing only one sealing member, namely, a single plastic insulating disk (with current collector therethrough) at the open end of the cell housing. The single plastic sealing member provides sufficient support during cell crimping and produces a tight seal. This of course is not to say that such a single plastic insulating disk can not be used in larger cell sizes.

The end cap assembly of the invention comprises a plastic insulating sealing disk, a terminal end cap, and an elongated current collector. The insulating sealing disk is preferably comprised of nylon 66 or nylon 612, preferably nylon 612. The end cap assembly may also comprise an insulating washer which underlies the end cap. The insulating sealing disk has a thick central portion forming a boss with a central aperture therethrough, an integrally formed midsection region extending radially from the boss, and an integrally formed peripheral edge. The midsection region of the insulating sealing disk has at least one thinned portion which forms a rupturable membrane. The rupturable membrane is preferably in the form of a circular island configuration but may be of other configuration, for example, oval, rectangular, parallelepiped or polygonal or in the form of straight or arcuate grooves. The membrane ruptures when gas pressure with the cell reaches a predetermined level.

The end cap assembly is formed by inserting the insulating disk into the open end of the cylindrical housing of a small cell, preferably a AAAA size alkaline cell. A portion of the outer surface of the peripheral edge of the insulating disk rests against a circumferential indent (bead) in the surface of the housing at the open end of the housing. The insulating disk is held in place by crimping the peripheral edge of the housing over the peripheral edge of the insulating disk. (Housing in vertical position with end cap assembly on top.) An insulating washer may be placed over the insulating disk so that the peripheral edge of the washer rests on top of the peripheral edge of the housing at the open end of the cell. The head of an elongated current collector is joined to the terminal end cap plate and the current collector is inserted into the central aperture within the boss. Thus, the insulating washer and terminal end cap are located external to the cell housing as they are stacked on top of the peripheral edge of the housing such that no portion of the end cap or insulating washer lies within the cell housing interior. The insulating washer electrically insulates the terminal end cap from the cell housing.

BRIEF DESCRIPTION OF THE DRAWINGS

The invention is more fully described with reference to the drawings in which.

DETAILED DESCRIPTION

The end cap assembly 10 of the invention (FIGS. 1–3) is suitable for application to cylindrical alkaline cells, preferably having a housing diameter less than the diameter of AAA size cell housing, that is, less than about 10 millimeters, desirably a housing outside diameter between about 7 and 9 millimeters. The end cap assembly 10 of the invention is particularly suitable for application to cylindrical AAAA size alkaline cells. Such cells can have a housing outside diameter typically between about 7.7 and 8.3 millimeters. This, of course, is not to say that such end cap assembly can not be used in larger cell sizes, depending upon the strength of the plastic and/or the expected internal pressure.

Figure 1:
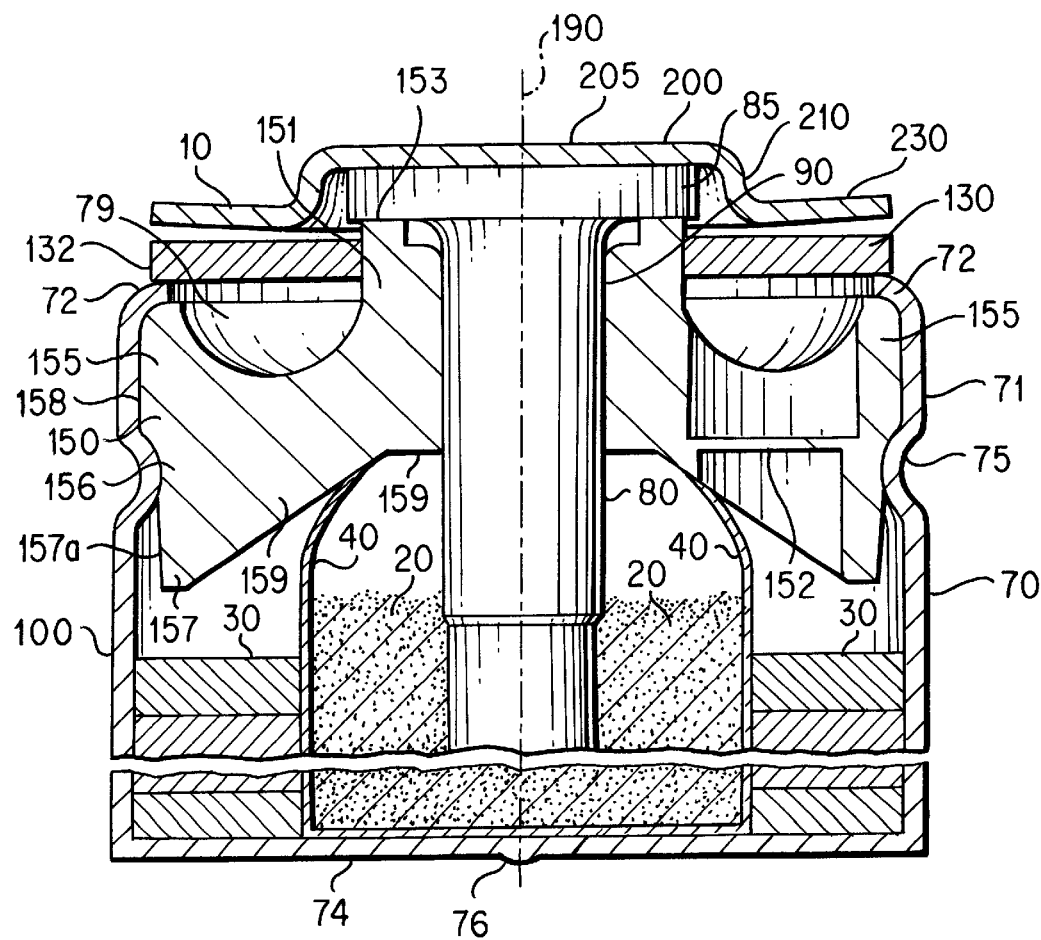
FIG. 1 is a cross sectional view of a specific embodiment of the end cap assembly of the invention sealed within the open end of an AAAA (LR61) alkaline cell.
Figure 2:
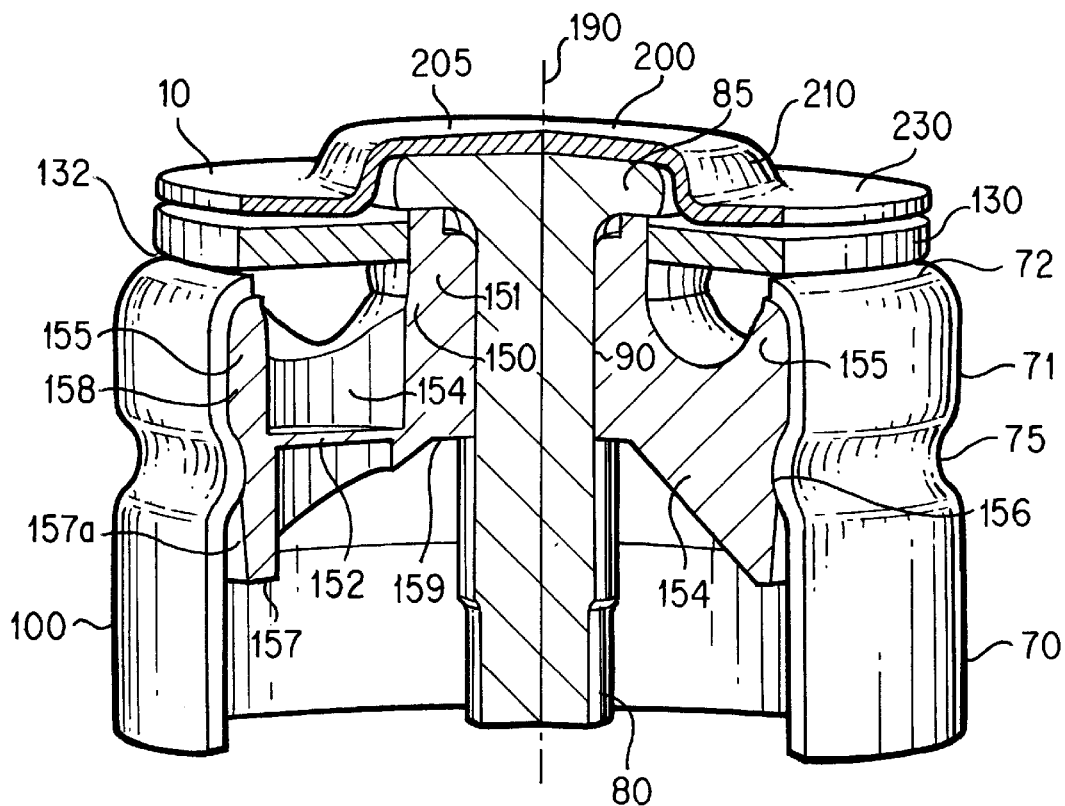
FIG. 2 is a cut-away view in perspective of the end cap assembly shown in FIG. 1.
Figure 3:
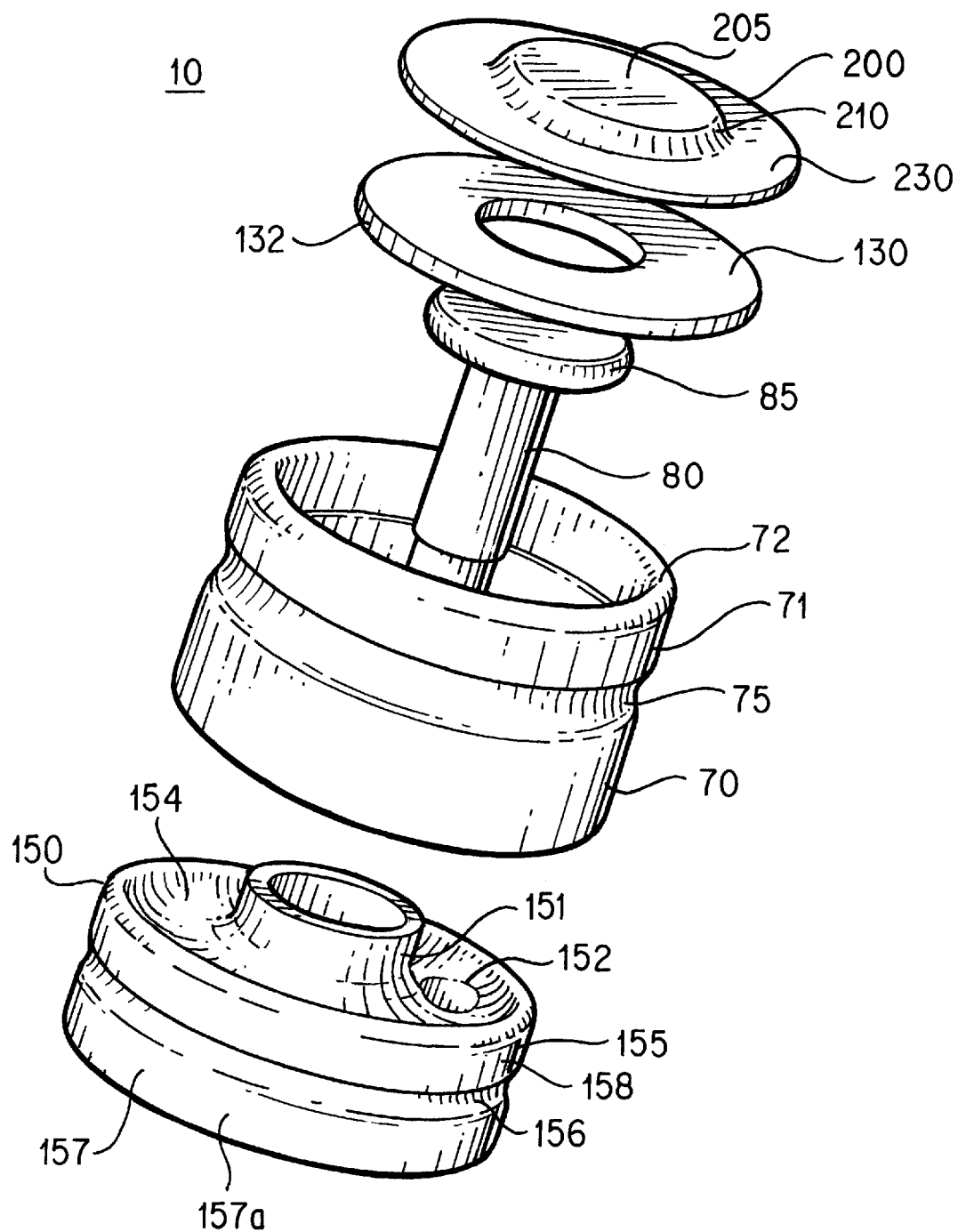
FIG. 3 is an exploded view of the components comprising the end cap assembly shown in FIGS. 1 and 2.

A specific embodiment of the end cap assembly 10 of the invention preferred for the AAAA (Quad A) alkaline cell 100 is shown in FIGS. 1–3. (The AAAA cell is cross referenced by American National Standards Institute (ANSI) as "25A" cell and in Europe by the International Electrotechnical Commission (IEC) designation "LR61" cell.) The AAAA (LR61) alkaline cell 100 (FIG. 1) is a cylindrical cell comprising a cylindrical housing 70 of length of between about 41.5 and 42.5 millimeters and outside diameter of between about 7.7 and 8.3 millimeters. The housing 70 wall thickness may be between about 0.1 mm and 0.25 mm. The AAAA (LR61) cell 100 may employ alkaline cell anode, cathode, and electrolyte chemistries and separator material conventionally employed in larger cells, for example, AA or C and D cells. Thus, cell 100 may have an anode 20 comprising zinc, a cathode 30 comprising compacted manganese dioxide, and an electrolyte within the anode comprising potassium hydroxide. Additives may be employed, as conventional, to modify the cell chemistry. The alkaline cell may employ an ion porous separator material 40, typically comprising rayon or cellulose. The end cap assembly 10 of the invention is not intended to be restricted to any particular alkaline cell chemistry and/or alkaline cell size. The end cap assembly 10 of the invention in one preferred embodiment is intended for application to AAAA (LR61) size alkaline cells employing conventional alkaline cell chemistries and modifications thereof. Such representative chemistries, for example, is disclosed in U.S. Pat. No. 5,401,590, herein incorporated by reference.

The end cap assembly shown in FIGS. 1, 2 and 3 comprises an insulating sealing disk 150, a terminal end cap 200, and an elongated current collector 80. End cap 200 forms the negative terminal of AAAA alkaline cell 100 (FIG. 2) The end cap assembly 10 may also comprise an insulating washer 130 which underlies end cap 200. (The description herein is made with reference to the figures which show the end cap assembly 10 when viewed with the cell oriented in vertical position with the end cap assembly 10 on top.) The terminal end cap 200 is preferably "hat shaped" having a flat central portion 205 from which extends a downwardly stepped flat annular edge 230 as shown in FIG. 1.

Figure 2A:
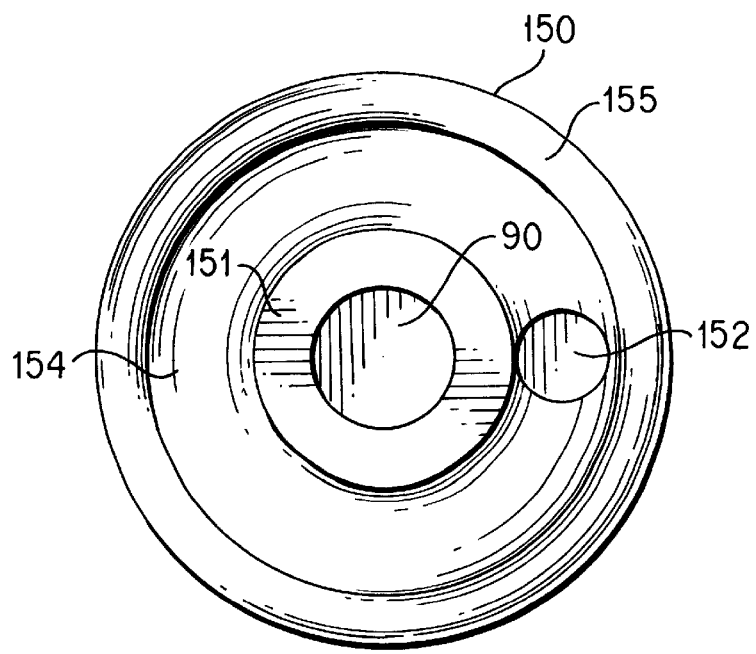
FIG. 2A is a top plan view of the insulating disk showing a rupturable membrane therein.

Insulating disk 150 has a thick central section which forms boss 151 which has a central aperture 90 therethrough. Central aperture 90 is provided for insertion therein of metallic current collector 80. The head 85 of current collector 80 is desirably welded to the bottom surface of the flat central portion 205 of end cap 200. Insulating washer 130 provides electrical insulation between end cap 200 and the peripheral edge 72 of cell housing 70. In alkaline cell 100 any portion of the housing 70 can form the positive terminal. Preferably, the positive terminal is pip (surface protrusion) 76 located at the closed end 74 of housing 70. Insulating disk 150 has a midsection region 154 located between boss 151 and peripheral edge 155. A circumferential leg 157 extends downwardly from peripheral edge 155 and forms a circumferential skirt 157a below circumferential indent 75 and around the bottom of the insulating disk 150. Leg 157 extends towards the cell interior to a level below the plane of the bottom surface 159 of boss 151. Leg 157 does not contact cell housing 70 and preferably does not form a snap fit around circumferential indent 75 thereby permitting easy insertion of the peripheral edge 155 of disk 150 onto circumferential indent 75 during cell assembly. That is, only small amount of force is needed to insert peripheral edge 155 of disk 150 onto circumferential indent 75, since it is preferably not snap fitted around indent 75. (Snap fit occurs if the maximum outside diameter of the circumferential skirt 157a below circumferential indent 75 is greater than the cell inside diameter in the plane of said circumferential indent 75. Conversely, snap fit within the housing does not occur if the maximum outside diameter of the circumferential skirt 157a below said circumferential indent 75 is less than the cell inside diameter in the plane of said indent 75, as in the embodiment illustrated in FIGS. 1 and 2.) Leg 157 provides additional structural support to insulating disk 150 and allows greater radial forces to be applied to insulating disk 150 during crimping of the top portion 71 of the cell housing around said sealing disk. Midsection 154 has at least one integral thinned portion 152 which forms a rupturable membrane, oriented preferably perpendicular to the cell's longitudinal axis 190. Rupturable membrane 152 may desirably be in the configuration of a circular island as shown in FIG. 2A. Rupturable membrane 152 may be of other shape, for example, oval, rectangular, parallelepiped or polygonal. Alternatively, rupturable membrane 152 may be in the form of straight or curved grooves forming a thin rupturable region within a portion of insulating disk 150. Rupturable membrane 152 is advantageously formed during the molding of insulating disk 150, preferably by injection molding.

The end cap assembly 10 (FIGS. 1 and 2) is assembled from the individual components (FIG. 3) by first inserting the plastic insulating disk 150 into the open end 79 of a cylindrical housing 70. Housing 70 has a circumferential indent in its surface forming circumferential bead 75 near the open end 79. The insulating disk 150 has a circumferential groove 156 around the outside surface of its peripheral edge 155 (FIGS. 1 and 3). Insulating disk 150 is inserted so that groove 156 rests on circumferential bead 75 which forms a seat for insulating disk 150. Housing 70 is initially formed so that it has an enlarged portion 71 at the open end 79. That is, the diameter of housing 70 at open end 79 is initially larger than the diameter of the rest of the housing. The enlarged portion 71 of housing 70 is radially compressed around the peripheral edge 155 of insulating disk 150 until the inside surface of housing portion 71 presses very firmly against the outside surface 158 of peripheral edge 155. The peripheral edge 72 of cell housing 70 is then crimped over the peripheral edge 155 of insulating disk 150. An insulating washer 130 is then placed around the top of boss 151 so that the peripheral edge 132 of washer 130 rests on top of the peripheral edge 72 of housing 70 (FIG. 1). The inside surface of central portion 205 of end cap 200 is then welded to head 85 of current collector 80. Current collector 80 is then inserted downwardly through aperture 90 within boss 151. Boss 151 may initially be provided with a thin wall at the base of aperture 90 such that aperture 90 does not initially run completely through boss 151. In such case the thin wall is punctured as the current collector is forced through aperture 90, thereby providing a friction fit between current collector 80 and the wall defining aperture 90. Aperture 90 may also initially be of slightly smaller diameter than the diameter of current collector 80. This enhances the friction fit between the current collector 80 and the wall defining aperture 90. The current collector 80 is pushed through aperture 90 until head 85 of the current collector comes to rest against the top surface 153 of boss 151 with insulating washer 130 positioned between the peripheral edge 230 of end cap 200 and peripheral edge 72 of housing 70 (FIG. 1). In such embodiment end cap 200 with underlying insulating washer 130 lies stacked on top of the peripheral edge 72 of cell housing 70. When gas pressure within the cell reaches a predetermined level, membrane 152 ruptures allowing gas to escape to the environment through vent holes in the washer 130 and end cap 200.

Insulating disk 150 and integral rupturable membrane 152 may be composed of a durable, corrosion resistant plastic. Insulating disk 150 and integral rupturable membrane 152 is desirably composed of a polyamide (nylon), preferably nylon 66 or nylon 612, more preferably nylon 612. Alternatively, insulating disk 150 and membrane 152 may be composed of polypropylene, talc filled polypropylene, sulfonated polyethylene or other polyamide (nylon) grades. However, nylon 66 or nylon 612 have been determined to be more desirable materials for insulating disk 150 and membrane 152 in an AAAA alkaline cell 100. These materials are more desirable because they are durable, but yet softer than filled polymer such as talc filled polypropylene. Nylon 66 or nylon 612 also exhibits less creep than unfilled or filled polypropylene at all temperatures to which the cell may be exposed during normal operation. The insulating disk 150 formed of the softer material, namely, nylon 66 or nylon 612 allows peripheral edge 72 of housing 70 to be crimped over peripheral edge 155 of disk 150 with generally less force than would be required if filled polymeric material such as talc filled polypropylene were employed. This has been determined to result in easier and more reliable sealing of the very small diameter AAAA cell 100. Nylon 612 is the more preferred material for insulating disk 150 because it absorbs moisture better and is more chemically resistant and more resistant to cracking. Insulating disk 150 has a diameter corresponding to the inside diameter of cell housing 70. For cells less than AAA size, the diameter of insulating disk 150 is less than 10 mm, typically between about 7 and 9 mm. Specifically, for AAAA size cells the diameter of insulating disk 150 is between about 7.6 and 8.2 mm and its overall thickness is between about 3 and 5 mm, preferably about 4 mm.

Insulating washer 130, may be formed of plastic or heavy paper or cardboard. Preferably, insulating washer 130 is a plastic coated paper, e.g. polyethylene coated paper of overall thickness between about 0.2 and 0.5 mm. Housing 70 may preferably be nickel plated steel. End cap 200 is constructed of a conductive metal having good mechanical strength and corrosion resistance such as nickel plated cold rolled steel or stainless steel, preferably, nickel plated low carbon steel. Current collector 80 can be selected from a variety of known electrically conductive metals found to be useful as current collector materials, for example, brass, tin plated brass, bronze, copper or indium plated brass. To enhance the seal between insulating disk 150 and housing 70, a conventional water resistant sealing paste such as an asphalt based sealant, e.g., comprising bitumen and a suitable aromatic solvent, e.g. toluene. The sealing paste may be applied to the outer wall of peripheral edge 155 of insulating disk 150 or to the inside surface of housing 70 before the insulating disk 150 is inserted into the open end of housing 70. The same sealant may also be applied to the wall forming aperture 90 or to the outside surface of current collector 80 before the current collector 80 is inserted into aperture 90.

In the above described embodiment it has been determined that if the insulating disk 150 is formed of nylon 66 or nylon 612, the diameter of a circular rupturable membrane 152 may desirably be between about 1 and 2 millimeters and its thickness may be between about 0.03 and 0.2 millimeters. Such range allows membrane 152 to rupture when the cell internal gas pressure reaches a level between about 500 and 2000 psig ($3.45 \times 10^{+6}$ and $13.8 \times 10^{+6}$ pascal gage). (The pressure at which rupture occurs increases as membrane thickness is increased and decreases as membrane diameter is increased.) In a preferred embodiment membrane 152 is of circular configuration (FIG. 2A) having a thickness of about 0.08 mm and diameter of about 1.5 mm. In such design membrane 152 will rupture when the AAAA cell internal pressure reaches about 1100 psig ($7.6 \times 10^{+6}$ pascal gage). It is believed that a single rupturable membrane 152 within insulating disk 150 is sufficient to effect rupture at the desired level of internal pressure. However, it should be appreciated that insulating disk 150 may be provided with a plurality of isolated rupturable membranes as an added safety feature to assure that rupture occurs at the desired level of cell pressure.

Although the present invention has been described with respect to specific embodiments, it should be appreciated that variations are possible within the concept of the invention. Accordingly, the invention is not intended to be limited to the specific embodiments described herein but will be defined by the claims and equivalents thereof.

What is claimed is:

1. In an alkaline electrochemical cell, said cell having an open ended cylindrical cell housing and an end cap assembly inserted therein closing said housing, said cell having a positive and a negative terminal, said end cap assembly comprising an end cap and an electrically insulating sealing disk having a rupturable membrane therein, said insulating sealing disk having an elongated electrically conductive current collector passing therethrough, the current collector being in electrical contact with the end cap, said insulating sealing disk sealing the open end of said housing and providing electrical insulation between said current collector and said housing, and the edge of said housing being crimped over the peripheral edge of said insulating sealing disk to form a cell shoulder along the line of crimp, the improvement comprising:

the end cap assembly comprising an end cap, and an insulating sealing disk underlying said end cap, an elongated current collector penetrating through an aperture in said insulating sealing disk, wherein at least a portion of said insulating sealing disk lies within said cell housing, wherein said end cap is located entirely outside of said housing and wherein said end cap functions as a cell terminal, wherein said end cap assembly further comprises an insulating washer located between said insulating sealing disk and said end cap, wherein said end cap and said insulating washer are stacked over the peripheral edge of said housing at the open end thereof when the cell is viewed in vertical position with the end cap assembly on top, wherein said insulating washer electrically insulates said end cap from the cell housing, wherein said cylindrical cell housing is an AAAA (LR61) size and wherein said end cap assembly does not include a metal disk within any portion of said cell housing at the open end thereof.

2. The electrochemical cell of claim 1 wherein said insulating sealing disk comprises an integral central boss having an aperture therethrough for insertion of said current collector, a midsection region extending radially from said boss, and a peripheral edge having an outer surface abutting the inside surface of said housing at the open end thereof.

3. The electrochemical cell of claim 2 wherein said insulating sealing disk comprises an integral rupturable membrane portion located within said midsection region, wherein said membrane ruptures when gas pressure within the cell reaches a predetermined level.

4. The electrochemical cell of claim 3 wherein said rupturable membrane portion forms an island within a portion of said midsection.

5. The electrochemical cell of claim 4 wherein said rupturable membrane has a circular or oval configuration.

6. The electrochemical cell of claim 4 wherein said rupturable membrane has a polygonal configuration.

7. The electrochemical cell of claim 2 wherein said end cap assembly further comprises a sealant material comprising bitumen material between the peripheral edge of said insulating sealing disk and said housing.

8. The electrochemical cell of claim 2 wherein said housing has a circumferential indent in its surface and a portion of the peripheral edge of said insulating disk rests on said indent.

9. The electrochemical cell of claim 8 wherein said insulating sealing disk has an integral leg, said integral leg forming a circumferential skirt extending downwardly from the peripheral edge of said insulating sealing disk and below said indent when the cell is viewed in vertical position with the end cap assembly on top, wherein said insulating disk does not form a snap fit around said indent.

10. The electrochemical cell of claim 9 wherein the maximum outside diameter of said circumferential skirt below said indent is less than the inside diameter of said cell in the plane of said circumferential indent.

11. The electrochemical cell of claim 2 wherein a portion of the housing at the open end thereof is radially compressed against the peripheral edge of said insulating sealing disk.

12. The electrochemical cell of claim 1 wherein the end cap is a disk comprising a flat central portion and a downwardly stepped peripheral edge extending therefrom when viewed with the cell in vertical position with the end cap on top.

13. The electrochemical cell of claim 12 wherein an end of said current collector is welded to said flat central portion of said end cap.

14. The electrochemical cell of claim 12 wherein said insulating washer prevents contact between said stepped peripheral edge of the end cap and said housing.

15. The electrochemical cell of claim 1 wherein said insulating washer comprises paper.

16. The electrochemical cell of claim 1 wherein said insulating sealing disk comprises nylon 66.

17. The electrochemical cell of claim 1 wherein the insulating sealing disk comprises nylon 612.

18. The electrochemical cell of claim 1 wherein said AAAA (LR61) cell housing has an outside diameter of between about 7.7 and 8.3 millimeters.

19. The electrochemical cell of claim 1 wherein the insulating sealing disk has an overall thickness of between about 3 and 5 mm and a diameter of between about 7.6 and 8.2 mm.

20. The electrochemical cell of claim 19 wherein the rupturable membrane within said insulating sealing disk has a thickness of between about 0.03 and 0.2 mm.

21. In an alkaline electrochemical cell having an open ended cylindrical cell housing and an end cap assembly inserted therein closing said housing, said cell having a positive and a negative terminal, said end cap assembly comprising an end cap and an electrically insulating sealing disk having a rupturable membrane therein, said insulating sealing disk having an elongated electrically conductive current collector passing therethrough, the current collector being in electrical contact with the end cap, said insulating sealing disk sealing the open end of said housing and providing electrical insulation between said current collector and said housing, and the edge of said housing being crimped over the peripheral edge of said insulating sealing disk to form a cell shoulder along the line of crimp, the improvement comprising:

said cylindrical cell housing having a diameter less than the diameter of an AAA size cell housing, the end cap assembly comprising an end cap, and an insulating sealing disk underlying said end cap, an elongated current collector penetrating through an aperture in said insulating sealing disk, and an insulating washer located between said insulating sealing disk and said end cap, wherein at least a portion of said insulating sealing disk lies within said cell housing, wherein said end cap functions as a cell terminal, wherein said end cap is located entirely outside of said housing, wherein said end cap and said insulating washer are stacked over the peripheral edge of said housing at the open end thereof when the cell is viewed in vertical position with the end cap assembly on top, wherein said insulating washer electrically insulates said end cap from said cell housing and wherein said end cap assembly does not include a metal disk within said cell housing at the open end thereof.

22. The electrochemical cell of claim 21 wherein said alkaline cell housing has a diameter between about 7 and 9 millimeters.

23. The electrochemical cell of claim 21 wherein said cell housing is an AAAA (LR61) size having an outside diameter of between about 7.7 and 8.3 millimeters.

24. The electrochemical cell of claim 21 wherein the insulating sealing disk comprises nylon 66.

25. The electrochemical cell of claim 21 wherein the insulating sealing disk comprises nylon 612.

26. The electrochemical cell of claim 23 wherein the insulating sealing disk has an overall thickness of between about 3 and 5 mm and a diameter of between about 7.6 and 8.2 mm.

27. The electrochemical cell of claim 26 wherein the insulating sealing disk has an integral rupturable membrane having a thickness of between about 0.03 and 0.2 mm.

28. The electrochemical cell of claim 21 wherein said housing has a circumferential indent in its surface and a portion of the peripheral edge of said insulating disk rests on said indent.

29. The electrochemical cell of claim 28 wherein said insulating sealing disk has an integral leg, said integral leg forming a circumferential skirt extending downwardly from the peripheral edge of said insulating sealing disk and below said indent when the cell is viewed in vertical position with the end cap assembly on top, wherein said insulating disk does not form a snap fit around said indent.

30. The electrochemical cell of claim 29 wherein the maximum outside diameter of said circumferential skirt below said indent is less than the inside diameter of said cell in the plane of said circumferential indent.

31. An alkaline electrochemical cell comprising an open ended cylindrical cell housing and an end cap assembly inserted therein closing said housing, said end cap assembly comprising an end cap, and an insulating sealing disk underlying said end cap, an elongated current collector penetrating through an aperture in said insulating sealing disk, wherein at least a portion of said insulating sealing disk lies within said cell housing, wherein said end cap is located entirely outside of said housing; wherein said end cap assembly does not include a metal disk within any portion of said cell housing at the open end thereof; wherein the housing at the open end thereof is radially compressed against the peripheral edge of said insulating sealing disk; and wherein said housing has a circumferential indent and a portion of the peripheral edge of said insulating sealing disk rests on said indent.

32. The electrochemical cell of claim 31 wherein said insulating sealing disk has an integral leg, said integral leg forming a circumferential skirt extending downwardly from the peripheral edge of said insulating sealing disk and below said indent when the cell is viewed in vertical position with the end cap assembly on top, wherein said insulating disk does not form a snap fit around said indent.

33. The electrochemical cell of claim 32 wherein the maximum outside diameter of said circumferential skirt below said indent is less than the inside diameter of said cell in the plane of said circumferential indent.

* * * * *